(12) United States Patent
Vilermo et al.

(10) Patent No.: US 9,903,938 B2
(45) Date of Patent: Feb. 27, 2018

(54) RADIO AND AUDIO LOCALIZATION

(71) Applicant: Nokia Technologies Oy, Espoo (FI)

(72) Inventors: Miikka Tapani Vilermo, Siuro (FI);
Lasse Juhani Laaksonen, Tampere (FI); Arto Juhani Lehtiniemi, Lempäälä (FI); Mikko Tapio Tammi, Tampere (FI)

(73) Assignee: Nokia Technologies Oy, Espoo (FI)

( * ) Notice: Subject to any disclaimer, the term of this patent is extended or adjusted under 35 U.S.C. 154(b) by 250 days.

(21) Appl. No.: 14/613,246

(22) Filed: Feb. 3, 2015

(65) Prior Publication Data
US 2016/0223640 A1 Aug. 4, 2016

(51) Int. Cl.
*G01S 5/02* (2010.01)
*G01S 11/14* (2006.01)
*G01S 11/04* (2006.01)
*G01S 3/02* (2006.01)

(52) U.S. Cl.
CPC .......... *G01S 5/0284* (2013.01); *G01S 5/0257* (2013.01); *G01S 11/14* (2013.01); *G01S 3/02* (2013.01); *G01S 11/04* (2013.01)

(58) Field of Classification Search
CPC .......... G01S 11/16; G01S 5/30; G01S 5/0284; G01S 5/0257
See application file for complete search history.

(56) References Cited

U.S. PATENT DOCUMENTS

| | | | | |
|---|---|---|---|---|
| 4,751,689 A | * | 6/1988 | Kobayashi | G01S 11/16 367/127 |
| 4,813,025 A | * | 3/1989 | Rowland | G08B 21/088 128/201.19 |
| 8,008,926 B2 | * | 8/2011 | Park | G01R 31/1254 324/458 |
| 2007/0237030 A1 | * | 10/2007 | Barger | G01S 5/22 367/127 |

(Continued)

FOREIGN PATENT DOCUMENTS

| | | |
|---|---|---|
| EP | 1571461 A1 | 9/2005 |
| EP | 2733502 A1 | 5/2014 |

(Continued)

OTHER PUBLICATIONS

Oksar, Irfan. "A Bluetooth signal strength based indoor localization method." (Abstract) Systems, Signals and Image Processing (IWSSIP), 2014 International Conference on. IEEE, 2014.

(Continued)

*Primary Examiner* — Hovhannes Baghdasaryan
(74) *Attorney, Agent, or Firm* — Mintz Levin Cohn Ferris Glovsky and Popeo, P.C.

(57) ABSTRACT

In some example embodiments there is provided a method. The method may include receiving, at a user equipment, at least one radio signal and at least one audio signal received via a microphone at the user equipment; and determining, by the user equipment, a distance between the user equipment and at least one other device by at least determining angle of arrival for the at least one radio signal and determining a (Continued)

time difference of arrival for the audio signal received via the microphone. Related systems, methods, and articles of manufacture are also described.

18 Claims, 6 Drawing Sheets

(56) References Cited

U.S. PATENT DOCUMENTS

| | | | |
|---|---|---|---|
| 2012/0069714 A1* | 3/2012 | Nakadai | G01S 3/8006 367/125 |
| 2012/0127831 A1 | 5/2012 | Gicklhorn et al. | |
| 2013/0102324 A1 | 4/2013 | Qiu et al. | |
| 2013/0259237 A1* | 10/2013 | Oesch | H04R 25/407 381/2 |

FOREIGN PATENT DOCUMENTS

| | | |
|---|---|---|
| WO | WO-2013121369 A1 | 8/2013 |
| WO | WO-2014183081 A2 | 11/2014 |

OTHER PUBLICATIONS

Shale, Ubejd, and Angel Rodriguez. "Indoor positioning using sensor-fusion in android devices." (2011).

\* cited by examiner

RADIO AND AUDIO LOCALIZATION

FIELD

The subject matter described herein relates to determining the location of other devices based on radio and audio signals.

BACKGROUND

Ambient sounds can be used to determine the relative positions of devices with at least one microphone. The time difference of arrival (TDOA) between a pair of microphone may then be calculated. The TDOA information may yield a distance value indicative of the difference in the distance between the microphones. Although seemingly simple, the TDOA process becomes difficult to implement in real-world settings where the sound source and environment cannot be controlled. As a consequence, TDOA based processing may not provide sufficiently accurate localization values.

SUMMARY

In some example embodiments there is provided a method. The method may include receiving, at a user equipment, at least one radio signal and at least one audio signal received via a microphone at the user equipment; and determining, by the user equipment, a distance between the user equipment and at least one other device by at least determining angle of arrival for the at least one radio signal and determining a time difference of arrival for the audio signal received via the microphone.

In some example embodiments, there is provided an apparatus. The apparatus may include an apparatus at least one processor; and at least one memory including computer program code, the at least one memory and the computer program code configured to, with the at least one processor, cause the apparatus to perform at least the following: receive, at the apparatus, at least one radio signal and at least one audio signal received via a microphone at the apparatus; and determine, by the apparatus, a distance between the apparatus and at least one other device, wherein the apparatus is configured to determine the distance by at least determine angle of arrival for the at least one radio signal and determine a time difference of arrival for the audio signal received via the microphone.

In some example embodiments, there is provided a non-transitory computer-readable storage medium including computer-program code, which when executed by at least one processor causes operations including receiving, at a user equipment, at least one radio signal and at least one audio signal received via a microphone at the user equipment; and determining, by the user equipment, a distance between the user equipment and at least one other device by at least determining angle of arrival for the at least one radio signal and determining a time difference of arrival for the audio signal received via the microphone.

In some example embodiments, there is provided an apparatus including means for receiving, at the apparatus, at least one radio signal and at least one audio signal received via a microphone at the apparatus; and means for determining, by the apparatus, a distance between the apparatus and at least one other device, wherein the apparatus is configured to determine the distance by at least determine angle of arrival for the at least one radio signal and determine a time difference of arrival for the audio signal received via the microphone.

In some variations, one or more of the features disclosed herein including the following features can optionally be included in any feasible combination. The at least one radio signal may be received at an antenna array. At least one angle between the user equipment and the at least one other device may be determined based on the determined angle of arrival information, at least one angle between the user equipment and the at least one other device. At least one candidate distance between the user equipment and the at least one other device may be selected, wherein the candidate distance represents an estimate determined from the at least one angle between the user equipment and the at least one other device. At least one audio measured distance between the user equipment and the at least one other device may be determined based on at least the determined time difference of arrival for the audio signal received via the microphone. The at least one audio measured distance may be normalized to enable a comparison to at least one other audio measured distance. A first ratio may be formed of the at least one audio measured distance to a corresponding candidate distance, and a second ratio may be formed of the at least one other audio measured distance to another corresponding candidate distance. A magnitude of the first ratio to the second ratio may be compared to determine a best estimate of the distance.

The above-noted aspects and features may be implemented in systems, apparatuses, methods, and/or computer-readable media depending on the desired configuration. The details of one or more variations of the subject matter described herein are set forth in the accompanying drawings and the description below. Features and advantages of the subject matter described herein will be apparent from the description and drawings, and from the claims. In some exemplary embodiments, one of more variations may be made as well as described in the detailed description below and/or as described in the following features.

Like labels are used to refer to the same or similar items in the drawings.

DETAILED DESCRIPTION

Localizing the position of a device may be performed in a variety of ways. However, audio exclusive approaches for accurate localization and positioning may require audio coming from a variety of directions, which is not always the case. In some example embodiments, there is provided radio and audio localization. Specifically, received radio signals may be used to determine angle-of-arrival (AoA) between at least two devices, and the AoA information may be used to determine candidate distances between the devices. Audio signals may be received as well, and the audio signals may be processed to measure distances based on TDOA between the microphones of the receiving devices. The measured distance(s) and the originally determined angle information may be further processed to finally determine the distances between the receiving devices. The distances may be used to determine the relative positions of the devices. The measured distance may also be associated with a confidence metric that indicates the reliability of the audio measured distance.

Figure 1:
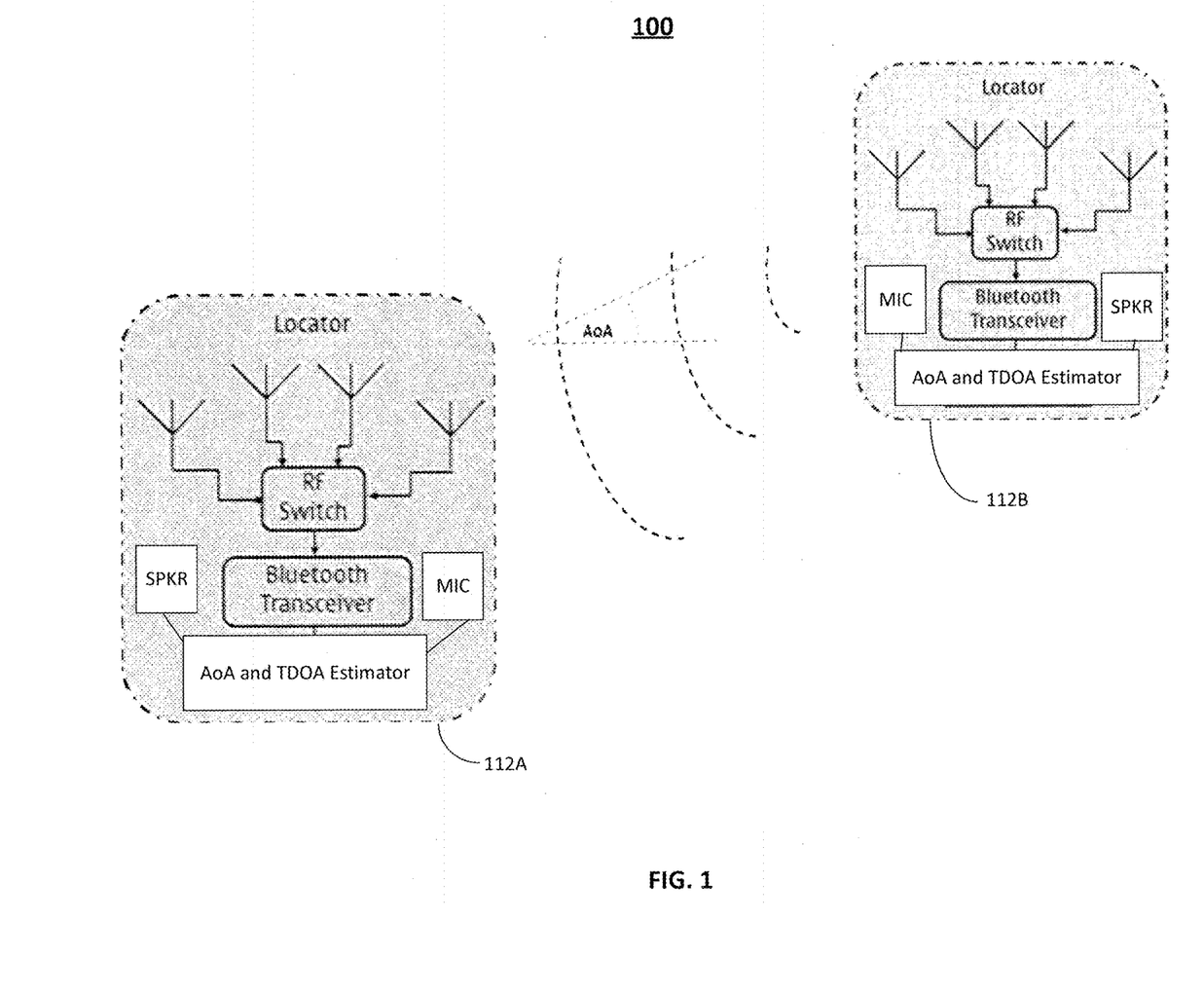
FIG. 1 depicts an example of a system including radio and sound localization, in accordance with some example embodiments.

FIG. 1 depicts an example of a system 100, in accordance with some example embodiments. In the example system 100, wireless devices 112A-B may include a short-range radio technology, such as Bluetooth Low Energy (BTLE), and a corresponding antenna. The antenna may comprise an array of at least two antennas, in accordance with some example embodiments. Moreover, the BTLE device may include a microphone (MIC), a speaker (SPKR), and/or other audio components for generating, receiving, and/or processing audio as well. Although some of the examples described herein refer to BTLE, other radio technologies may be used as well including Bluetooth, WiFi, Near Field Communications (NFC), and/or any other radio access technology. Moreover, although FIG. 1 depicts the receiving device 112A and the transmitting devices 112B as each having an antenna array, the transmitter may not include the antenna array if AoA based processing of the radio signals is not being performed at the device. For example, transmitting device 112B may be embodied as a BTLE or NFC tag device with an antenna array, transceiver, and/or AoA and TDOA estimator.

BTLE device 112B may transmit a packet which is received as a radio signal via the antenna array at BTLE device 112A. The antenna array enables a determination of the AoA of the packets transmitted by the BTLE device 112B. For example, BTLE device 112A may receive the packet and execute amplitude and phase sampling, during the reception of the AoA packet transmitted by the BTLE device 112B, to determine the angle of arrival of the received packet. This AoA information may indicate the angle to the transmitting BTLE device 112B. However, the angle does not, without more information, provide an accurate distance to the neighboring device 112B, so audio based processing in accordance with some example embodiments is also provided.

Figure 2A:
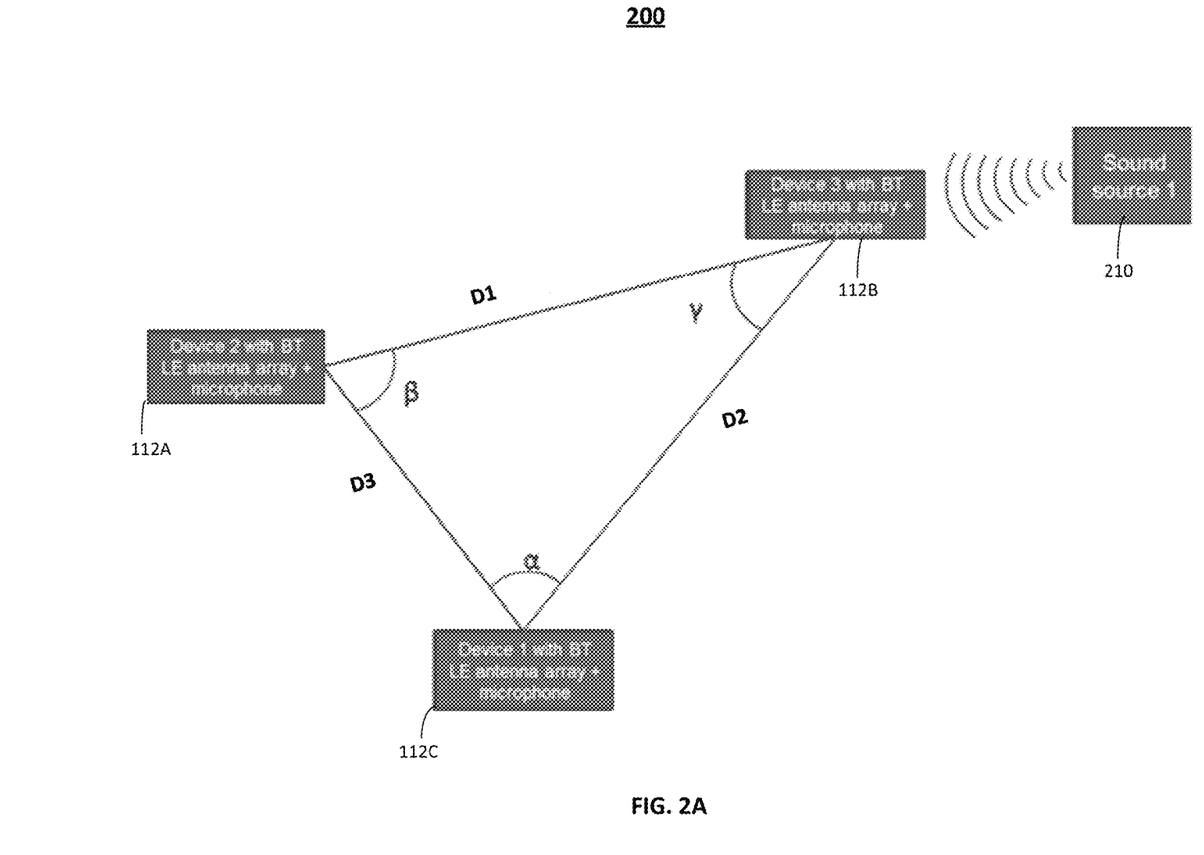
FIG. 2A depicts another example of a system including radio and sound localization, in accordance with some example embodiments.

FIG. 2A depicts another example of a system 200, in accordance with some example embodiments. The system 200 may include BTLE devices 112A-C. For example, BTLE devices 112A-C may be located in a room, a building, and/or other location as well.

In the example of FIG. 2A, BTLE device 112A may determine, as described above, the AoA of incoming packets received from BTLE device 112B and received from BTLE device 112C, which yields a first angle, β. Similarly, BTLE device 112B may determine the AoA of incoming packets received from BTLE device 112A and received from BTLE device 112C, which yields a second angle, γ. Furthermore, BTLE device 112C may determine the AoA of incoming packets received from BTLE device 112A and received from BTLE device 112B, which yields a third angle, α. Although FIG. 2A depicts three BTLE devices, other quantities of BTLE devices may be implemented at system 200 as well.

In some example embodiments, a candidate distance is selected. For example, a distance, D1, may be selected as shown at FIG. 2A. The first angle β, second angle γ, and third angle α can be used to determine other candidate distances D2 and D3 from the selected candidate distance D1. The candidate distances D1-D3 are relative distances as the angles can be used to provide the relative distances based on geometry/trigonometry but not the actual distances.

In some example embodiments, received audio signals may be processed to measure the distances between BTLE devices 112A-C based on for example TDOA and the correlation of the received audio signals at each of the microphones at BTLE devices 112A-C. This audio technique may yield audio measured distances for the distances D1, D2, and D3. In some example embodiments, the largest ratio of the audio measured distance to the corresponding candidate distance may represent the audio measured distance having the greatest reliability. For example, the TDOA of an audio signal sent by sound source 210 may provide the greatest distance ratio between BTLE devices 112A-B along distance D1, when compared to the distance ratios between BTLE devices 112A and 112C which receive the audio signal from sound source 210 at about the same time. In this example, the smaller distance ratio may be a less reliable indicator of distance than the greater distance ratio associated with D1. As such, the measured audio distance between BTLE devices 112A and B may, in accordance with some example embodiments, be selected as this distance that has the greatest distance ratio and also corresponds in this example to the largest audio measured distance ratio to candidate distance ratio may, as noted, provide a so-called "best estimate" having higher confidence when compared to the smaller audio measured distance to candidate distance ratios. The measured audio distance may then be used to determine the values of the other distances between the devices with assistance from the first angle β, second angle γ, and third angle α.

Figure 2B:
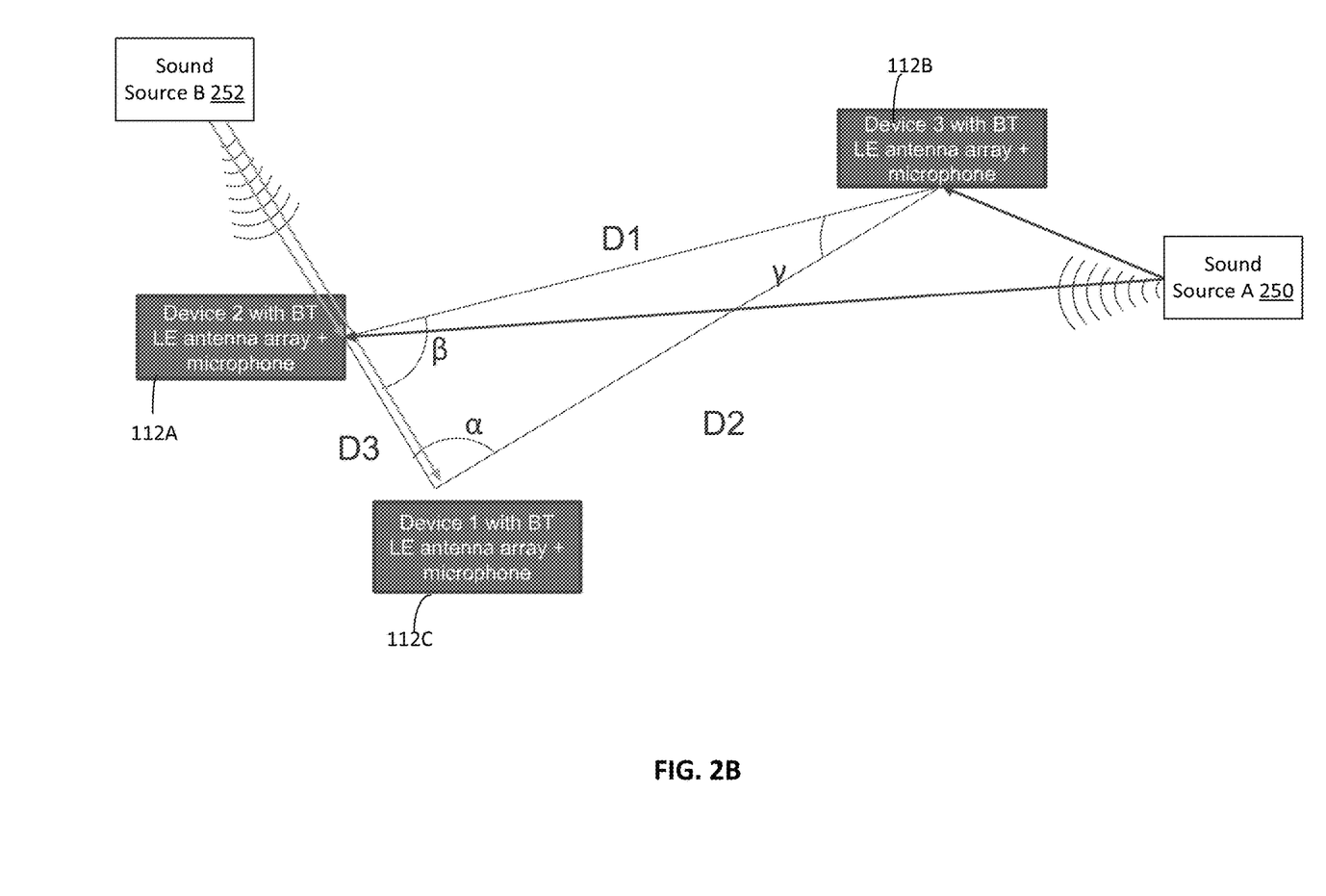
FIG. 2B depicts another example of a system including plurality of sound sources, in accordance with some example embodiments.

FIG. 2B depicts another example in accordance with some example embodiments. In the example of FIG. 2B, there are two sound sources 250 and 252. Here, the TDOA of an audio signal sent by sound source 252 may provide most reliable indicator of distance because the sound from source 252 travels directly along path D3, when compared to the sound source 250 which travels between path D1 for BTLE devices 112B and 112A. In this example, the time differences associated with D1/source 250 and D3/source 252 may be normalized before comparison by dividing the TDOA estimate for D3 by the candidate distance for D3 and dividing the TDOA estimate for D1 by the candidate distance for D1. In this example, D3 will be selected as the best estimate having the largest audio measured distance ratio to candidate distance ratio from among the other measured distances.

Figure 3:
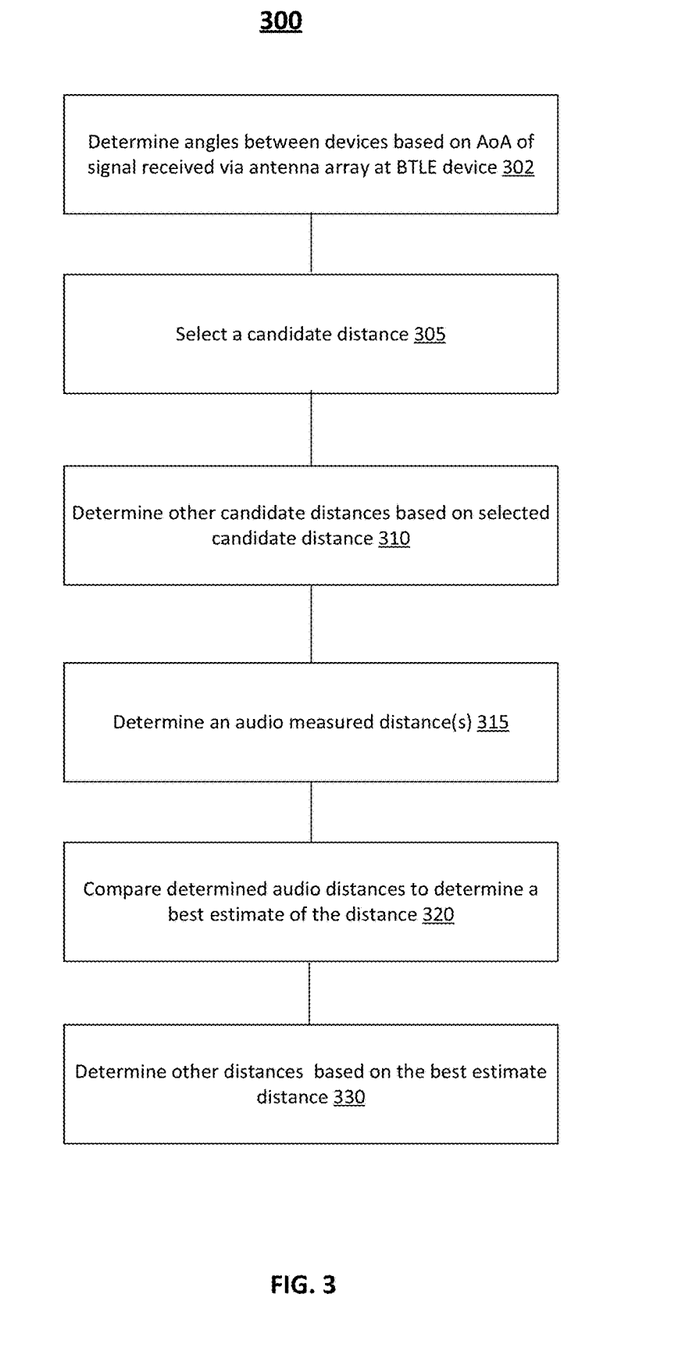
FIG. 3 depicts an example of a process for radio and sound localization, in accordance with some example embodiments.

FIG. 3 depicts an example of a process 300 for determining the position of devices based on radio and audio signals, in accordance with some example embodiments. The description of FIG. 3 also refers to FIGS. 1 and 2.

At 302, an angle is determined between devices based on at least the AoA of a radio signal received via an antenna array, such as a BTLE antenna array in accordance with some example embodiments. A radio signal transmitted by BTLE device 112B may be received at BTLE device 112A, where the difference in received phase at each element in the antenna array may be used to derive an AoA value for the received radio signal. Similarly, a signal transmitted by BTLE device 112C may be received at BTLE device 112A. As such, BTLE device 112A may determine the angles to BTLE devices 112A-B, and thus the first angle, β. As noted, BTLE device 112B may similarly determine the second angle, γ, while BTLE device 112C may determine third angle, α.

At 305, a candidate distance is selected, in accordance with some example embodiments. Once the angles have been determined, the relative shape and distances between BTLE devices 112A-C may be determined as shown in FIG. 2A. However, the actual distances, D1-D3, are not yet known (as different values of D1-D3 may satisfy the geometry dictated by the angles). BTLE device 112A may select a candidate distance for D1. This initial guess of D1 may be any value. However, the initial guess of D1 may also be determined based on some measured or provided information, such as a user input estimate, signal strength (for example, strong signals may correspond to 20 centimeters, medium signals 1 meter, and weak signals 5 meters), and/or the like.

At 310, other candidate distances may be determined based on the selected candidate distance, in accordance with some example embodiments. For example, from the selected candidate distance (305), other distances may be determined in accordance with the following equations:

$$D2 = D1 * \frac{\sin\beta}{\sin\alpha}$$

$$D3 = D1 * \frac{\sin\gamma}{\sin\alpha}.$$

These candidate distances for D1, D2, and D3 represent so-called "guesses" of the correct distances, but the guesses may be used to choose a best estimate for the correct distance as described further below with respect to 315-330.

At 315, a measured distance may be determined based on received audio, in accordance with some example embodiments. BTLE devices 112A-C may each include an audio receiver, such as a microphone. Sound received at the devices may be used to localize the BTLE devices 112A-C using a variety of techniques including time difference of arrival (TDOA). In the case of TDOA, the time difference of arrival between the devices may be used to localize and thus determine the distance of the devices. An example of a TDOA method for localizing devices is described at P. Pertilä et al., "Passive Self-Localization of Microphones Using Ambient Sounds," EUSIPCO, Bucharest, Romania, Aug. 27-31, 2012, which is incorporated herein by reference.

To process the TDOA information from the microphones at BTLE devices 112A-C, BTLE devices 112A-C may each record received sound emanated by one or more sources, such as sound source 210 (although the sound source may be at one of the devices as well, for example a speaker or other sound source/generator at the device). The recorded sound may then be sampled and quantized using for example an analog-to-digital converter. In some example embodiments, quantized sound signal may be segmented into frames of a certain size (for example, 2*M+2*N=2*2824+2*1412 samples), although other frame sizes may be used as well. Moreover, the frames may be configured to be overlapping. Between microphone pairs among devices 112A-C, a correlation, such as a cross correlation, may be calculated in each frame as follows:

$$(x_j * x_k)[n] = \sum_{m=-M}^{M} x_j[m]x_k[m+n]$$

wherein $x_j$ is microphone j signal, $x_k$ is microphone k signal, n is delay index, and M is a limit to the cross correlation calculation. The range of values for n to be calculated may be varied. For example, assuming a speed of sound 340 meters per second, a sampling rate 48000 Hz, and a maximum distance between devices of about 10 meters, the value of the delay index is about 1412. With larger values of M, a better long term average may be determined, but a smaller value of M may provide a quicker calculation and more frequent updates to the device positions. For example, the value of M may be selected to be twice the value of N (for example, M may be equal to 2824 given the n of 1412 noted above).

From the cross correlation, a TDOA may be calculated for each frame using the following equation:

$$\tau_{jk} = \left\| \underset{n}{\mathrm{argmax}}((x_j * x_k)[n]) \right\|$$

wherein $x_j$ is microphone j signal, $x_k$ is microphone k signal, and n is an index to the sampled audio signal.

Figure 4:
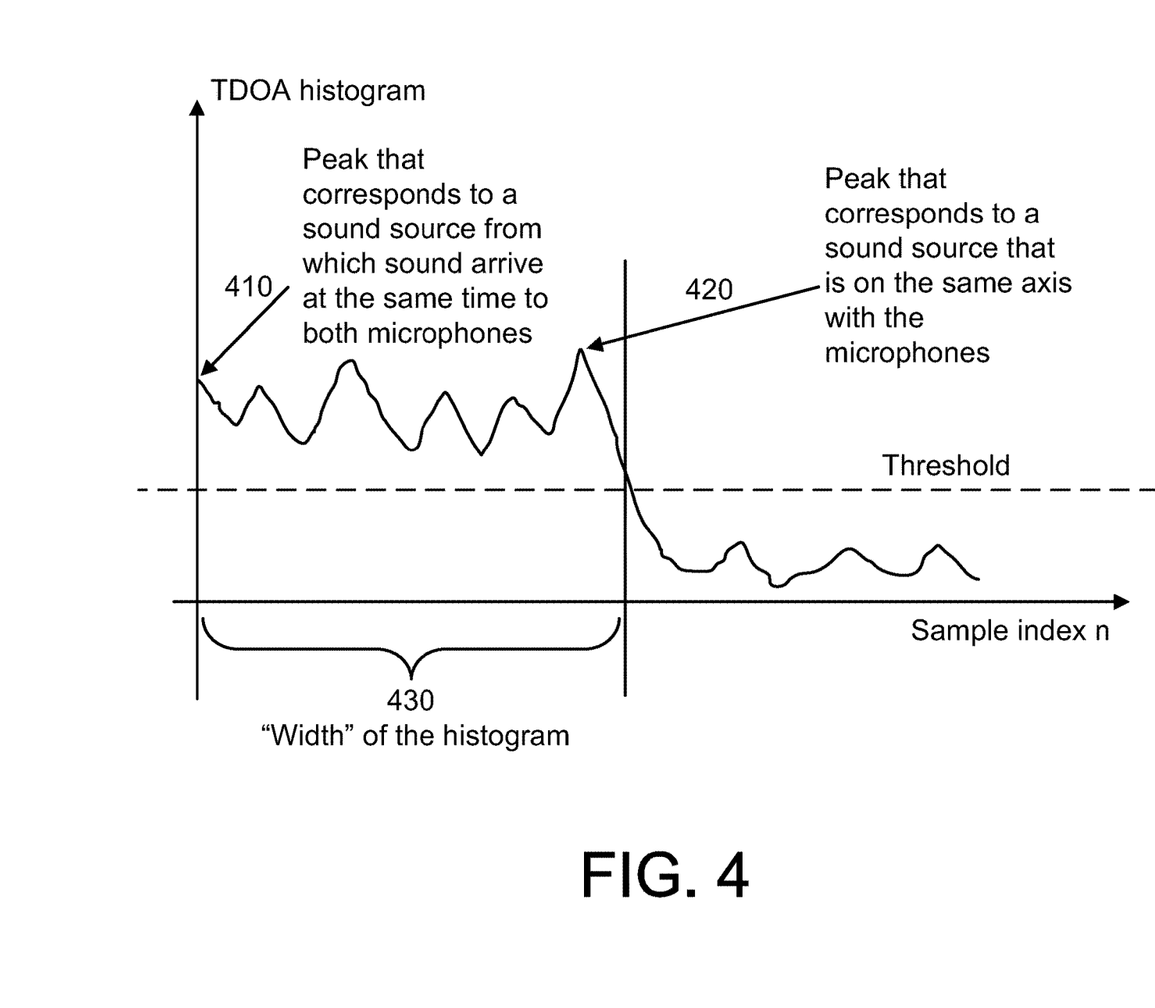
FIG. 4 depicts an example histogram where an audio distance measurement may be performed, in accordance with some example embodiments.

In some example embodiments, a histogram of the TDOA values from several frames may be created for each pair of BTLE devices/microphones. An example of a histogram is depicted at FIG. 4.

When there is a sound source from which the sound arrives at the same time at a pair of microphones, a peak may result in the histogram at a sample index value 0 (labeled 410) in the histogram. For example, sound source 210 may arrive at BTLE devices 112A and B at the same time, causing sample index value 0 (at 410). When there is a sound source on the axis that goes through a pair of microphones (but not between the microphones, as in the case of "Sound source 1" 210 at FIG. 2A), this may cause a peak 420 in the histogram at a position that corresponds to the distance between the microphones. For example, sound source 210 may travel along D1 between BTLE devices 112A and B, this may cause peak 420 in the histogram corresponding to the distance between the microphones. All other peaks in the histogram may fall between those two peaks 410 and 420. Outside this range there may be no peaks as a direct sound (which causes the highest cross correlation) should not take longer to travel from one microphone to another microphone, when compared to a straight sound path between the microphones. In the example of FIG. 4, the width 430 of the histogram may correspond to the distance between two BTLE devices, and this width 430 in samples n can be converted to a distance using the following equation:

$$l = \frac{n}{f_s} c$$

wherein $f_s$ is sampling rate and c is the speed of sound. This distance, l, may be calculated pairwise for all of the microphone pairs l(j,k). Referring again to FIG. 3, at 315, at least one audio signal received at microphones at each of the BTLE devices 112A-C may be processed based on TDOA (for example, as described above) to measure via audio the distances between BTLE devices 112A-C.

At 320, the audio measured distances l(j,k) determined at 315 may then be compared to the candidate distances (for example, g(j,k) determined at 305 and 310) to determine a best estimate, in accordance with some example embodiments. The calculated audio distance from 315 that has the largest ratio (in comparison to the candidate distance as noted above with the examples of FIGS. 2A-2B) is most likely to have a sound source on the same or similar axis. For example, the best estimate microphone pair may be selected as the maximum according to the following equation:

$$(\hat{j}, \hat{k}) = \operatorname{argmax}_{j,k} \frac{l(j, k)}{g(j, k)}.$$

At 330, the other distances may be calculated using the best estimate determined at 320, in accordance with some example embodiments. For example, the best estimate, distance l($\hat{j}$, $\hat{k}$), may then be used to determine distances D2 and D3 in accordance with the angles, β, γ, and α in accordance with the following equations:

$$D1 = l(\hat{j}, \hat{k})$$

$$D2 = D1 * \frac{\sin\beta}{\sin\alpha} l(\hat{j}, \hat{k});$$

and $$D3 = D2 * \frac{\sin\gamma}{\sin\alpha} l(\hat{j}, \hat{k}).$$

The values of D1-D3 now represent the distance between the BTLE device 112A-C. Moreover, the value of the selection of the best estimate based on the greatest TDOA may provide an indication of the confidence or reliability of the measured distances D1-D3.

In some example embodiments, the processing 300 may be performed at one or more of devices 112A-C, although a single device may perform process 300 as well.

Example Use Cases

To illustrate, a group of users may be playing a game on devices connected wirelessly via for example BTLE. A user may see common game elements on a display as well as aspects unique to that user, such as the user's own statistics/score. Each player may take a turn, but the game may assign the turn to a corresponding device/user based on the relative location of the devices in the room (for example, clockwise from user and device to the next user and device), and the location of the devices may be determined in accordance with process 300.

To illustrate further, a group of users may want to share information between some of their devices. The users may connect their devices to each other wirelessly. A user may flick (for example, move the device towards another device) for example a file or picture towards another user's device. The devices may then determine their relative locations via process 300 and thus determine which device was the target of the flick and thus the destination for the file or picture.

In yet another example use, in a shop, the user's device may automatically detect the presence of the other BTLE antenna arrays that send information. The device may then automatically locate via process 300 itself with respect to the other BTLE devices and display the information to the user (for example, "milk is on sale 5 meters behind you").

In some example embodiments, device orientation may be determined as well. For example, if a device has only one microphone, the device's location with respect to the other devices can be determined as described above; however, the device's orientation may not be determined unless an accelerometer is used. If a device has two microphones, the locations of both microphones can be determined. When the locations of both the microphones are known, the device's orientation may be known apart from a rotation along an axis that goes through the microphones. If a device has three or more microphones, the locations of all three microphones can be found. When the locations of all three microphones is known, the device's orientation is known (unless all the microphones are along the same axis).

In some example embodiments, process 300 may be performed, so that users do not have to actively connect the devices but instead there may be a program running on the BTLE devices that automatically detects other BTLE devices and obtains information about the location of other BTLE devices.

Figure 5:
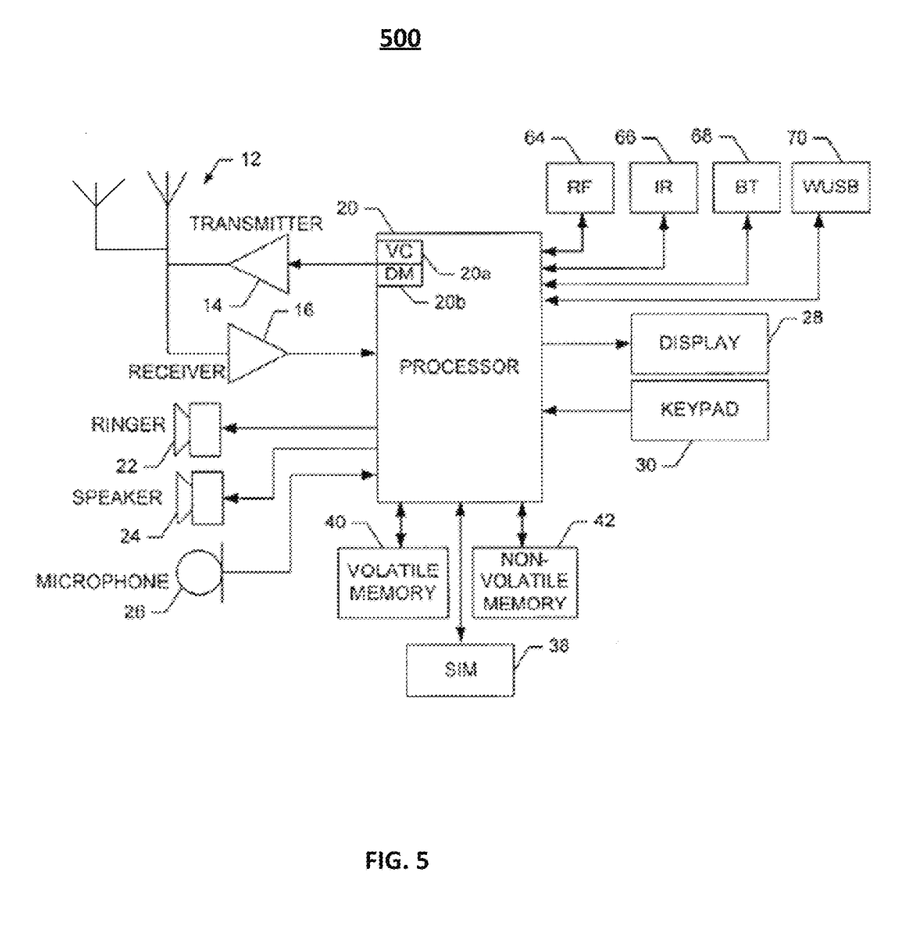
FIG. 5 depicts an example of an apparatus, in accordance with some example embodiments.

FIG. 5 depicts an example of an apparatus 500, in accordance with some example embodiments. The apparatus 500 may comprise a user equipment, such as a smart phone, a tablet, a cell phone, a wearable radio device, a tag, and/or any other radio based device.

In some example embodiments, apparatus 500 may also include a radio communication link to a cellular network, or other wireless network. The apparatus 500 may include an antenna array 12 in communication with a transmitter 14 and a receiver 16. Alternatively transmit and receive antennas may be separate.

The apparatus 500 may also include a processor 20 configured to provide signals to and from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 130 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Apparatus 500 may include a location processor and/or an interface to obtain location information, such as positioning and/or navigation information. Accordingly, although illustrated in as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as, Institute of Electrical and Electronics Engineers (IEEE) 802.11, 802.16, and/or the like. In addition, these signals may include speech data, user generated data, user requested data, and/or the like.

The apparatus 500 may be capable of operating with one or more air interface standards, communication protocols, modulation types, access types, and/or the like. For example, the apparatus 500 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 500 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 500 may be capable of operating in accordance with 2.5G wireless communication protocols General Packet Radio Service (GPRS), Enhanced Data GSM Environment (EDGE), and/or the like. Further, for example, the apparatus 500 may be capable of operating in accordance with 3G wireless communication protocols, such as, Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 130 may be additionally capable of operating in accordance with 3.9G wireless communication protocols, such as, Long Term Evolution (LTE), Evolved Universal Terrestrial Radio Access Network (E-UTRAN), and/or the like. Additionally, for example, the apparatus 500 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 500. For example, the processor 20 may comprise a digital signal processor device, a microprocessor device, an analog-to-digital converter, a digital-to-analog converter, and/or the like. Control and signal processing functions of the apparatus 500 may be allocated between these devices according to their respective capabilities. The processor 20 may additionally comprise an internal voice coder (VC) 20*a*, an internal data modem (DM) 20*b*, and/or the like. Further, the processor 20 may include functionality to operate one or more software programs, which may be stored in memory. In general, processor 20 and stored software instructions may be configured to cause apparatus 500 to perform actions. For example, processor 20 may be capable of operating a connectivity program, such as, a web browser. The connectivity program may allow the apparatus 500 to transmit and receive web content, such as location-based content, according to a protocol, such as, wireless application protocol, wireless access point, hypertext transfer protocol, HTTP, and/or the like.

Apparatus 500 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 500 may include a battery for powering various circuits related to the mobile terminal, for example, a circuit to provide mechanical vibration as a detectable output. The user input interface may comprise devices allowing the apparatus 500 to receive data, such as, a keypad 30 (which can be a virtual keyboard presented on display 28 or an externally coupled keyboard) and/or other input devices.

Moreover, the apparatus 500 may include a short-range radio frequency (RF) transceiver and/or interrogator 64, so data may be shared with and/or obtained from electronic devices in accordance with RF techniques. The apparatus 500 may include other short-range transceivers, such as an infrared (IR) transceiver 66, a Bluetooth (BT) transceiver 68 operating using Bluetooth wireless technology, a wireless universal serial bus (USB) transceiver 70, and/or the like. The Bluetooth transceiver 68 may be capable of operating according to low power or ultra-low power Bluetooth technology, for example, Wibree, Bluetooth Low-Energy, NFC, and other radio standards. In this regard, the apparatus 500 and, in particular, the short-range transceiver may be capable of transmitting data to and/or receiving data from electronic devices within proximity of the apparatus, such as within 10 meters. The apparatus 500 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 500 may comprise memory, such as, a subscriber identity module (SIM) 38, a removable user identity module (R-UIM), and/or the like, which may store information elements related to a mobile subscriber. In addition to the SIM, the apparatus 500 may include other removable and/or fixed memory. The apparatus 500 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations as described herein at for example process 300. The memories may comprise an identifier, such as an international mobile equipment identification (IMEI) code, capable of uniquely identifying apparatus 500. The functions may include one or more of the operations disclosed herein with respect to process 300. In the example embodiment, the processor 20 may be configured using computer code stored at memory 40 and/or 42 to provide the operations, such as receiving, at a user equipment, at least one radio signal received via an antenna array at the user equipment and at least one audio signal received via a microphone at the user equipment; and determining, by the user equipment, a distance between the user equipment and at least one other device by at least determining angle of arrival for the at least one radio signal received via the antenna array and determining a time difference of arrival for the audio signal received via the microphone.

Some of the embodiments disclosed herein may be implemented in software, hardware, application logic, or a combination of software, hardware, and application logic. The software, application logic, and/or hardware may reside in memory 40, the control apparatus 20, or electronic components disclosed herein, for example. In some example embodiments, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry. A computer-readable medium may comprise a non-transitory computer-readable storage medium that may be any media that can contain or store the instructions for use by or in connection with an instruction execution system, apparatus, or device, such as a computer. Furthermore, some of the embodiments disclosed herein include computer programs configured to cause methods as disclosed herein (see, for example, the process 300 and the like).

Without in any way limiting the scope, interpretation, or application of the claims appearing below, a technical effect of one or more of the example embodiments disclosed herein is multi-device localization.

The subject matter described herein may be embodied in systems, apparatus, methods, and/or articles depending on the desired configuration. For example, the systems, apparatus, methods, and/or articles described herein can be implemented using one or more of the following: electronic components such as transistors, inductors, capacitors, resistors, and the like, a processor executing program code, an application-specific integrated circuit (ASIC), a digital signal processor (DSP), an embedded processor, a field programmable gate array (FPGA), and/or combinations thereof. These various example embodiments may include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the example embodiments described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed:

1. A method comprising:
   receiving, by a user equipment, at least one radio signal and at least one audio signal received via a microphone at the user equipment; and
   determining, by the user equipment, a distance between the user equipment and at least one other device by at least determining an angle of arrival for the at least one radio signal transmitted by the at least one other device and a time difference of arrival for the audio signal received via the microphone at the user equipment and a corresponding microphone of the at least one other device.

2. The method of claim 1, wherein the at least one radio signal is received at an antenna array.

3. The method of claim 1, further comprising:
   determining, based on the determined angle of arrival information, at least one angle between the user equipment and the at least one other device.

4. The method of claim 3, further comprising:
   selecting at least one candidate distance between the user equipment and the at least one other device, wherein the at least one candidate distance represents an estimate determined from the at least one angle between the user equipment and the at least one other device.

5. The method of claim 1, further comprising:
   determining at least one audio measured distance between the user equipment and the at least one other device based on at least the determined time difference of arrival for the audio signal received via the microphone at the user equipment and the corresponding microphone of the at least one other device.

6. The method of claim 1, further comprising:
   normalizing the at least one audio measured distance to enable a comparison to at least one other audio measured distance.

7. The method of claim 6, wherein the normalizing further comprises:
   forming a first ratio of the at least one audio measured distance to a corresponding candidate distance and forming a second ratio of the at least one other audio measured distance to another corresponding candidate distance, wherein the corresponding candidate distance is a selected estimated distance, and wherein the another corresponding candidate distance is based on the corresponding candidate distance and the determined angle of arrival.

8. The method of claim 7, further comprising:
   comparing a magnitude of the first ratio to the second ratio to determine a best estimate of the distance.

9. An apparatus comprising:
   at least one processor; and at least one memory including computer program code, the at least one memory and the computer program code configured to, with the at least one processor, cause the apparatus to at least:
- receive, by the apparatus, at least one radio signal and at least one audio signal received via a microphone at the apparatus; and
- determine, by the apparatus, a distance between the apparatus and at least one other device, wherein the apparatus is configured to determine the distance by at least determining an angle of arrival for the at least one radio signal transmitted by the at least one other device and a time difference of arrival for the audio signal received via the microphone at the user equipment and a corresponding microphone of the at least one other device.

10. The apparatus of claim 9, wherein the at least one radio signal is received at an antenna array.

11. The apparatus of claim 9, wherein the apparatus is further configured to at least:
- determine, based on the determined angle of arrival information, at least one angle between the apparatus and the at least one other device.

12. The apparatus of claim 11, wherein the apparatus is further configured to at least:
- select at least one candidate distance between the apparatus and the at least one other device, wherein the at least one candidate distance represents an estimate determined from the at least one angle between the apparatus and the at least one other device.

13. The apparatus of claim 9, wherein the apparatus is further configured to at least:
- determine at least one audio measured distance between the apparatus and the at least one other device based on at least the determined time difference of arrival for the audio signal received via the microphone at the user equipment and the corresponding microphone of the at least one other device.

14. The apparatus of claim 9, wherein the apparatus is further configured to at least:
- normalize the at least one audio measured distance to enable a comparison to at least one other audio measured distance.

15. The apparatus of claim 14, wherein the apparatus is further configured to normalize by at least: form a first ratio of the at least one audio measured distance to a corresponding candidate distance and form a second ratio of the at least one other audio measured distance to another corresponding candidate distance, wherein the corresponding candidate distance is a selected estimated distance, and wherein the another corresponding candidate distance is based on the corresponding candidate distance and the determined angle of arrival.

16. The apparatus of claim 15, wherein the apparatus is further configured to at least:
- compare a magnitude of the first ratio to the second ratio to determine a best estimate of the distance.

17. The apparatus of claim 9, wherein the apparatus comprises a user equipment.

18. A non-transitory computer-readable storage medium including computer-program code, which when executed by at least one processor causes operations comprising:
- receiving, by a user equipment, at least one radio signal and at least one audio signal received via a microphone at the user equipment; and
- determining, by the user equipment, a distance between the user equipment and at least one other device by at least determining an angle of arrival for the at least one radio signal transmitted by the at least one other device and a time difference of arrival for the audio signal received via the microphone at the user equipment and a corresponding microphone of the at least one other device.

* * * * *